United States Patent [19]

Scotti et al.

[11] 4,374,675

[45] Feb. 22, 1983

[54] POST-TREATED TITANIUM DIOXIDE AND PROCESS FOR PRODUCING SAME

[75] Inventors: Carlo Scotti, Voghera; Renato C. Pace, Alessandria; Sergio Carra', Milan, all of Italy

[73] Assignee: Montedison, S.p.A., Italy

[21] Appl. No.: 223,553

[22] Filed: Jan. 9, 1981

[30] Foreign Application Priority Data

Jan. 11, 1980 [IT] Italy .............................. 19156 A/80

[51] Int. Cl.$^3$ ............................................... C09C 1/36
[52] U.S. Cl. ................................ 106/300; 106/308 B; 106/308 Q; 427/218
[58] Field of Search ............... 106/300, 308 B, 308 Q; 427/215, 219, 218

[56] References Cited

U.S. PATENT DOCUMENTS

| | | | |
|---|---|---|---|
| 3,275,412 | 9/1966 | Skrivan | 106/300 X |
| 3,463,610 | 8/1969 | Groves et al. | 106/300 X |
| 3,515,566 | 6/1970 | Moody et al. | 106/300 |
| 3,640,744 | 2/1972 | Dietz et al. | 106/300 |
| 3,642,442 | 2/1972 | Hoekje et al. | 106/300 X |
| 4,050,951 | 9/1977 | Piccolo et al. | 106/300 |
| 4,224,080 | 9/1980 | Chambers et al. | 106/300 X |

*Primary Examiner*—Carl F. Dees
*Attorney, Agent, or Firm*—Bartholomew Verdirame; Thomas E. Harrison, Jr.

[57] ABSTRACT

This invention concerns a new product consisting of TiO$_2$ particles having pigmentary granulometric and morphological characteristics. It includes a chemically reactive coating consisting of a mixture of oxides and oxychlorides selected from the group consisting of Al$_2$O$_3$ and AlOCl; SiO$_2$ and SiOCl$_2$; and ZrO$_2$ and ZrOCl$_2$.

The particles of reactive TiO$_2$ product are prepared as follows: the surface of the TiO$_2$ particles is activated by thermally treating the particles in a moving bed with an anhydrous gas at 400°–600° C. The particles are then made to react in a moving bed at 350° C. to 600° C., in the presence of a carrier gas, with an inorganic chloride selected from the group consisting of AlCl$_3$, SiCl$_4$ and ZrCl$_4$.

This new product is useful, for instance, in TiO$_2$ pigments coated with organic molecules which provide an affinity for the vehicles of paints.

11 Claims, No Drawings

POST-TREATED TITANIUM DIOXIDE AND PROCESS FOR PRODUCING SAME

BACKGROUND OF THE INVENTION

The present invention concerns post-treated titanium dioxide (TiO₂) having pigmentary morphological and granulometric characteristics, as well as a process for producing said product.

One object of this invention is to provide a TiO₂ particle with pigmentary morphological and granulometric characteristics and endowed with a new property: i.e.; to have a chemically reactive coating.

Still another object of this invention is that of conferring to such a coating a strong adherence to the TiO₂ particles.

Yet another object of this invention is that of imparting to such a coating the property of being uniform and compact.

A further object of the invention is that of conferring to the TiO₂ particles thus coated, a specific surface controllable at will.

Another object still, is that of providing a process for obtaining the above said chemically reactive coating.

Still another object of the invention is that of preparing a pigment superfically coated with organic molecules which impart to it an affinity for the organic substances of the vehicles, for example, paint vehicles, starting from the TiO₂ with a chemically reactive coating.

All these objects and others still are achieved by the new product object of this invention, which consists of TiO₂ particles with pigmentary morphological and granulometric characteristics and is characterized in that said product has a chemically reactive coating consisting of a mixture of oxides and oxychlorides selected from the group consisting of Al₂O₃ and AlOCl; SiO₂ and SiOCl₂; and ZrO₂ and ZrOCl₂.

The chemical reactivity of these new products is due to the presence of the oxychlorides.

As a result of these reactive groups, one may, for example, fix onto the particles substances containing amine, carboxylic, or hydroxylic groups, thereby obtaining pigments with an affinity for organic vehicles, for example, vehicles for paints based on alkyd, polyester, melaminic, acrylic and phenolic resins.

In general, the atomic ratio between Cl and Al, Si or Zr, present in these new products, is between 0.10 and 0.90.

Still another object of this invention is a process for preparing TiO₂ particles with pigmentary morphological and granulometric characteristics having the above mentioned chemically reactive coating, this process being characterized in that the surface of the particles is activated in a moving bed by thermal treatment with an anhydrous gas at temperatures comprised between 400° and 600° C., and that the particles are then reacted in a moving bed with an inorganic chloride chosen out of a group consisting of: AlCl₃, SiCl₄ and ZrCl₄, in the presence of a carrier gas, at temperatures between 350° an 600° C.

SUMMARY OF THE INVENTION

This invention concerns a new product consisting of TiO₂ particles having pigmentary granulometric and morphological characteristics. It includes a chemically reactive coating consisting of a mixture of oxides and oxychlorides selected from the group consisting of Al₂O₃ and AlOCl; SiO₂ and SiOCl₂; and ZrO₂ and ZrOCl₂.

The particles of reactive TiO₂ product are prepared as follows: the surface of the TiO₂ particles is activated by thermally treating the particles in a moving bed with an anhydrous gas at 400°-600° C. The particles are then made to react in a moving bed at 350° C. to 600° C., in the presence of a carrier gas, with an inorganic chloride selected from the group consisting of AlCl₃, SiCl₄ and ZrCl₄.

This new product is useful, for instance, in TiO₂ pigments coated with organic molecules which provide an affinity for the vehicles of paints.

DESCRIPTION OF THE PREFERRED EMBODIMENTS

In the reaction stage there actually occurs with the chlorides a true and real corrosion reaction of the TiO₂ particles by the action of the chlorides themselves, according to the following reactions:

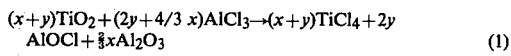

$$(x+y)\text{TiO}_2 + (2y+4/3\ x)\text{AlCl}_3 \rightarrow (x+y)\text{TiCl}_4 + 2y\ \text{AlOCl} + \tfrac{2}{3}x\text{Al}_2\text{O}_3 \quad (1)$$

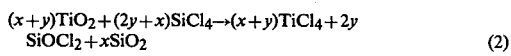

$$(x+y)\text{TiO}_2 + (2y+x)\text{SiCl}_4 \rightarrow (x+y)\text{TiCl}_4 + 2y\ \text{SiOCl}_2 + x\text{SiO}_2 \quad (2)$$

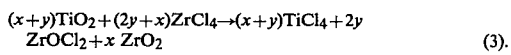

$$(x+y)\text{TiO}_2 + (2y+x)\text{ZrCl}_4 \rightarrow (x+y)\text{TiCl}_4 + 2y\ \text{ZrOCl}_2 + x\ \text{ZrO}_2 \quad (3).$$

In these reactions, the value of y tends to drop when the temperature rises. In other terms the quantity of the oxychlorides with respect to the corresponding oxides tends to decrease with the rise of the temperature.

The corrosion reaction of the TiO₂ is made possible by the preceding activation stage which, among others, has the effect of eliminating the superficial TiO₂ hydroxyls, hindering their reaction with AlCl₃, etc., with the formation of Al₂O₃, etc., which would cause the formation of a slight superficial "passivating" layer of Al₂O₃, etc., which would block any further reaction of TiO₂ with AlCl₃, etc.

The product obtained at the end of the chlorination stage stands out for the high adhesion of the coating to the particles.

This coating is compact and has a very uniform thickness wherefore the elementary particles of the pigment, especially in the case of Al₂O₃ and AlOCl, practically retain their original shape. Further, the specific surface of the pigment does not suffer any substantial increment, especially in the case of Al₂O₃ and AlOCl, unless one wishes to increase it within limits controllable at will, just following the procedures that will be explained in further detail.

In the activation and reaction stages there is used a moving bed, that is, a bed in which particles of TiO₂ are put in motion and into close contact with a gas going through the activation or reaction zone. Preferably one operates in a fluidized bed.

It has now been found, according to this invention that it is not necessary to disaggregate the elementary particles of pigment by grinding before treatment in order to obtain a good coating on the single particles.

This is quite convenient in as much as the TiO₂ particles often show up in form of aggregates having dimensions quite suited for their use in a moving bed, and more particularly in a fluidized bed.

Such is the case of TiO₂ via sulphate coming from a calcining furnace; it is quite sufficient to carry out a screening in order to eliminate the fraction exceeding about 500 microns.

If the available particles are too small for being used in a moving bed, they may be granulated according to the usual granulating techniques, for instance in a Heinrich type granulator.

If it is wished to reduce or increase the particle size of the available TiO₂ particles, it is preferable to bring their size to values comprised between 45 and 500 microns which are the sizes most suited for fluidized beds.

These values are referred to the minimum and maximum size of the particles, and do not refer to their mean diameter which may, for instance, be comprised between 80 to 130 micron.

As already explained, the activation phase is carried out at temperatures comprised between 400° and 600° C. Under 400° C., the activation reaction is too slow. Above 600° C. there are obtained end products of an inferior quality. Preferably it is operated at temperatures comprised between 500° and 600° C.

The anhydrous gas used for the activation may be, for example, nitrogen or air. The duration of the activation reaction increases as the treating temperature decreases and humidity of the starting product increases. Usually the activation times range is between about 15 minutes and 3 hours.

The activation must be carried out on an equipment that will ensure a good contact between the anhydrous gas and the TiO₂ particles; moving beds, and more particularly, fluidized beds are preferred. Pneumatic conveyors, rotary kilns, etc. may also be used.

The reaction stage with the chlorides takes place at temperatures comprised between 350° and 600° C. At temperatures below 350° C., the reaction tends to slow down too much, while, at temperatures above 600° C., the formation of oxichlorides becomes too limited; that is, the products that are obtained tend to become chemically less reactive.

Preferably one operates at temperatures between 400° and 500° C.

As a carrier gas, an anhydrous gas which is inert relative to TiO₂ and the chlorides themselves is preferred, unless one wishes to increase in a controllable way the specific surface of the particles, as will be explained further on.

The inert gas may be, for instance, nitrogen or a noble gas; but preferably nitrogen is used. The chloride vapors are introduced into the carrier gas.

A degree of conversion may be defined as consisting of the ratio between the TiO₂ that has reacted in the corrosion reaction and the TiO₂ of the starting pigment. Thus, the degree of conversion is a measure of the intensity of the corrosion as well as of the quantity of coating present on the particles.

By the process according to this invention, it is possible to control the degree of conversion by controlling both the reaction temperature (the higher the temperature, the faster the reaction) as well as the duration of the reaction stage itself. The degree of conversion may vary, for instance, from 0.1% to 5% and more.

The partial pressure of the chloride in the reaction medium is, in general, comprised between 0.005 and 0.15 atm.

The reaction shall be conducted in an apparatus suited for ensuring intimate contact between the solid and the gaseous phase. For such a purpose it is preferred that a moving bed and, more particularly, a fluidized bed be utilized.

The duration of the chlorination stage is a function of the temperature and the conversion degree on wishes to achieve. Suitable reaction times may be, for example, between 20 minutes and 2 hours.

In the case of the reaction with AlCl₃, the specific surface of the TiO₂ particles remains practically unchanged, while it slightly grows in the case of the reaction with SiCl₄ or ZrCl₄.

Whenever one wishes to obtain a greater specific surface of the particles, depending on the use to which they are directed according to this invention, contemporaneously with the reaction of the chloride with TiO₂, there may be carried out an oxidation reaction of the chloride itself with oxygen, such reaction causing the formation of the corresponding oxides according to equations (4), (5) and (6) and their deposit on the TiO₂ particles.

$$4AlCl_3 + 3O_2 \rightarrow 2Al_2O_3 + 6Cl_2 \qquad (4)$$

$$SiCl_4 + O_2 \rightarrow SiO_2 + 2Cl_2 \qquad (5)$$

$$ZrCl_4 + O_2 \rightarrow ZrO_2 + 2Cl_2 \qquad (6)$$

Since the oxides that have been formed according to the above reactions deposit themselves onto the TiO₂ particles instead of being produced by a reaction with them, they will form, for the part pertaining to them, a less uniform coating than the one that is obtained by the corrosion reaction alone, wherefore one will obtain an increase in specific surface.

Carrying out a mixed TiO₂-corrosion and chloride-oxidation reaction, the coating that will be formed will contain oxides coming from both reactions and the increase in specific surface must be ascribed, in the case of AlCl₃, almost exclusively to the oxidation reaction, while in the case of SiCl₄ and ZrCl₄ it will be due to both reactions.

If one wishes to carry out the oxidation reaction, it will be necessary to operate at at least 400° C. Below this temperature, the reaction occurs in fact in a much too limited way. As the temperature is increased above 400° C., the oxidation reaction takes place with increasing intensity, wherefore there contemporaneously will grow both the specific surface of the particles as well as the quantity of oxide in the coating coming from the oxidation reaction.

The mixed TiO₂ chlorination and chloride-oxidation reaction is preferably carried out at 400°–500° C.

When both reactions are conducted contemporaneously, it is preferred to use air as carrier gas. The specific surface of the coating may be controlled at will by playing on the use or omission of the oxidation reaction and on its intensity which, in its turn, depends on the temperature used.

The product obtained at the end of the corrosion reaction or of the mixed corrosion and oxidation reaction, is an acid product, given the presence of the oxychlorides. Its pH varies, for instance, between 4.4 and 6.3. Also an object of this invention is a process for the preparation of the titanium dioxide pigment coated with organic substances containing aminic, carboxylic or hydroxylic groups capable of imparting to the pigment an affinity for organic vehicles, for instance in paints.

For this purpose there are prepared TiO₂ particles having a chemically reactive coating, and these particles are then made to react with organic substances having —NH$_2$, —COOH or —OH groups. The reaction preferably takes place at temperatures between 20° and 200° C. Preferably the reaction is to be conducted in an aprotic organic solvent. Suitable solvents include, for example, tetrahydrofurane and n-hexane.

Among the suitable organic substances which may be used are: lactic acid, isopropanolamine, monopropyletherethylene glycol, monomethylether-ethylene glycol and trimethylolpropane.

The end product will thus consist of TiO$_2$ particles coated with a first layer of oxide of Al, Si or Zr and a second layer of an organic substance chemically bound to the first layer.

The following set of examples are given in order to further illustrate the inventive idea of this invention.

EXAMPLE 1

There was used a discontinuous fluid-bed reactor consisting of a quartz pipe having an inside diameter of 4.5 cm.

The disengaging height of the bed amounted to 50 cm. This reactor was loaded with 60 g of TiO$_2$ at a 99.9% concentration and of rutile crystalline structure, and with an elementary granulometry characterized by a mean geometrical diameter $d_g$ equal to 0.185 micron, by a standard geometrical deviation $\sigma g = 1.37$ and by a specific surface of 5.5 sq. mt/g.

The TiO$_2$ was obtained from the sulphate process and was drawn off at the outlet of the calcining furnace. The product presented itself in the form of aggregates with a mean diameter of 110 microns.

The activation stage was conducted maintaining the reactor at 600° C. and by subjecting the titanium dioxide to a 50 Nl/hr flow of nitrogen for 120 minutes.

The corrosion reaction was conducted at 500° C. with a 100 Nl/hr flow of a gaseous mixture consisting of N$_2$ and AlCl$_3$, in which mixture the partial pressure of AlCl$_3$ was $1.46.10^{-2}$ atm. which corresponds to $5.97.10^{-7}$ mols/cc.

The corrosion treatment lasted 127 minutes and yielded a deposit of Al$_2$O$_3$ and AlOCl which, calculated as Al$_2$O$_3$, corresponded to 1.4% on the total weight of the particles (i.e.: on the weight of TiO$_2$ and its coating).

The quantity of Cl and Al in the coating was determined by fluorescence X-ray examination. The atomic ratio Cl/Al proved to be equal to 0.41. The product showed a pH of 4.4 and a specific surface of 5.6 sq.mt/g.

The photostability of the product was measured in a Resial 1180 based enamel baked at 135° C. Resial 1180, produced by Montedison SpA, is an alkydic resin. The pigment specimen in the enamel was subjected, in an accelerated exposure test, to the UV radiation of a carbon-arc lamp, produced by a Fade-Ometer of the Atlas Electric Devices Co. The duration of the exposure was 17 hrs. On the basis of the reflectance loss with the blue filter after exposure, there was calculated a photoinstability index $F_i$ which is so much the lower, the greater the photostability of the product.

The photoinstability index $F_i$ of the product proved lower than or equal to 0.1, while that of the starting TiO$_2$ was 1.65.

EXAMPLE 2

The activation stage was repeated as described in Example 1. Thereupon, there was carried out a corrosion stage with AlCl$_3$ with a contemporaneous oxidation at 400° C., by means of a 100 Nl/hr. flow of a gaseous mixture consisting of air and AlCl$_3$, wherein the partial pressure of the AlCl$_3$ was equal to $1.46.10^{-2}$ atm. The treatment time amounted to 360 minutes.

The product that was thus obtained, displayed an Al$_2$O$_3$ and AlOCl coating equivalent to 1.08% by weight of Al$_2$O$_3$ on the total weight of the particles. The atomic ratio Cl/Al was equal to 0.80. The product showed a pH of 4.4 and a specific surface of 6.5 sq.mt/g.

EXAMPLE 3

The activation as described in Example 1 was repeated. Thereupon there was carried out a corrosion reaction in nitrogen with AlCl$_3$.

The reaction was conducted at 600° C. with a 100 Nl/hr flow of a gaseous mixture containing N$_2$ and AlCl$_3$, wherein the partial pressure of AlCl$_3$ amounted to $1.46.10^{-2}$ atm. The duration of the reaction was 60 minutes. The product obtained had a coating of Al$_2$O$_3$ and AlOCl equivalent to 1.3% by weight of Al$_2$O$_3$ on the total weight of the particles. The atomic ratio Cl/Al was equal to 0.25.

The product displayed a pH equal to 4.8, an $F_i$ index lower than or equal to 0.1 and a specific surface of 5.3 sq.mt/g.

EXAMPLE 4

The activation stage according to the procedures of Example 1 was repeated. Thereupon, there was carried out a corrosion stage with AlCl$_3$ and contemporaneously an oxidation at 600° C., by means of a 100 Nl/hr flow of a gaseous mixture of air and AlCl$_3$, wherein the partial pressure of the AlCl$_3$ amounted to $1.46.10^{-2}$ atm. The treatment time amounted to 90 minutes.

The product obtained showed a coating of Al$_2$O$_3$ and AlOCl equivalent to 1.61% by weight of Al$_2$O$_3$ on the total weight of the particles. The atomic ratio Cl/Al proved to be lower than or equal to 0.10. The product showed a pH value of 5.2, an $F_i$ index lower than or equal to 0.1 and a specific surface of 8.5 sq.mt/g.

EXAMPLE 5

The activation stage of Example 1 was repeated. Thereupon there was carried out a corrosion stage in nitrogen with SiCl$_4$. The reaction was conducted at 400° C. with a 100 Nl/hr flow of a gaseous mixture consisting of N$_2$ and SiCl$_4$, wherein the partial pressure of the SiCl$_4$ was equal to $1.7.10^{-2}$ atm. The duration of the reaction amounted to 120 minutes.

The product thus obtained has a SiO$_2$ and SiOCl$_2$ coating equivalent to 1.1% by weight of SiO$_2$ on the total weight of the particles. The atomic ratio Cl/Si was equal to 0.89. The product obtained showed a pH value equal to 5.1 and a specific surface of 9.15 sq.mt/g.

EXAMPLE 6

The activation stage was carried out as described in Example 1. Thereupon there was carried out a corrosion stage with SiCl$_4$ and a contemporaneous oxidation at 600° C., by means of a 100 Nl/hr flow of a gaseous mixture of air and SiCl$_4$, in which the SiCl$_4$ pressure amounted to $1.4.10^{-2}$ atm. The time of treatment was equal to 180 minutes.

The product thus obtained showed a coating of SiO$_2$ and SiOCl$_2$ equivalent to 2.1% by weight of SiO$_2$ on the total weight of the particles. The atomic ratio Cl/Si amounted to 0.10. The product thus obtained showed a pH value of 6.3 and a specific surface of 9.0 sq.mt/g.

EXAMPLE 7

The activation stage was carried out following the procedures described in Example 1. Thereupon there was carried out a corrosion stage with $SiCl_4$ in nitrogen. The reaction was conducted at 500° C. in a 100 Nl/hr. flow of a gaseous mixture of $N_2$ and $SiCl_4$, wherein the partial pressure of $SiCl_4$ amounted to $1.4.10^{-2}$ atm. The duration of the reaction amounted to 180 minutes.

The product thus obtained has a $SiO_2$ and $SiOCl_2$ coating equivalent to 1.1% by weight of the $SiO_2$ on the total weight of the particles. The atomic ratio Cl/Si was equal to 0.45. The product showed a pH value of 5.85 and a specific surface of 8.4 sq.mt/g.

EXAMPLE 8

The activation stage was carried out according to the procedures of Example 1. Thereupon there was carried out a corrosion stage with $SiCl_4$ nitrogen. The reaction was conducted at 600° C. by means of a 100 Nl/hr flow of a gaseous mixture of $N_2$ and $SiCl_4$, wherein the partial pressure of the $SiCl_4$ amounted to $1.4.10^{-2}$ atm. The duration of the reaction amount to 180 minutes.

The product thus obtained showed a $SiO_2$ and $SiOCl_2$ coating equivalent to 1.6% by weight of $SiO_2$ on the total weight of the particles. The atomic ratio Cl/Si amounted to 0.15. The product showed a specific surface of 8.3 sq.mt/g.

EXAMPLE 9

The activation stage was carried out according to the procedures of Example 1. Thereupon, there was carried out a corrosion stage with $ZrCl_4$ in nitrogen. The reaction was conducted at a temperature of 600° C. with a 100 Nl/hr flow of a gaseous mixture consisting of nitrogen and $ZrCl_4$, with a partial pressure of $ZrCl_4$ equal to 40 mmHg corresponding to $5.3.10^{-2}$ atm. The duration of the operation amounted to 75 minutes and yielded a deposit of zirconium compounds equal to 2.6% by weight of $ZrO_2$ on the total weight of the particles. The atomic Cl/Zr ratio was equal to 0.10. The product coming from the corrosion stage showed a pH value equal to 5.3 and a specific surface of 8.4 sq.mt/g.

EXAMPLE 10

The activation stage was carried out following the same procedures as those of Example 1. Thereupon there was carried out a corrosion stage in nitrogen with $ZrCl_4$. The reaction was conducted at a temperature of 400° C. with a 100 Nl/hr flow of a gaseous mixture of $N_2$ and $ZrCl_4$, wherein the partial pressure of $ZrCl_4$ amounted to $5.3.10^{-2}$ atm. The duration of the reaction amounted to 120 minutes and the product thus obtained had a $ZrO_2$ and $ZrOCl_2$ coating equivalent to 1.2% by weight of $ZrO_2$ on the total weight of the particles. The product showed a pH value of 2.5 and a specific surface of 9.0 sq.mt/g. The atomic Cl/Zr ratio amounted to 0.65.

EXAMPLE 11

Using the same reactor as that described in Example 1, an activation stage was carried out at 450° C. subjecting the titanium dioxide to a 50 Nl/hr flow of nitrogen for 120 minutes.

Thereupon there was carried out a corrosion stage at 450° C. with $SiCl_4$, by means of a 100 Nl/hr flow of a gaseous mixture of nitrogen and $SiCl_4$, wherein the partial pressure of $SiCl_4$ amounted to $1.4.10^{-2}$ atm. The treatment time amounted to 180 minutes. At the end of the corrosion stage there was obtained a coating of silicon compounds equivalent to 1.3% by weight of $SiO_2$ on the total weight of the particles. The product thus obtained showed an atomic ratio Cl/Si of 0.7, a pH value of 2.5 and a specific surface of 8.7 sq.mt/g.

EXAMPLE 12

Using the same reactor as in Example 1, there was carried out at 450° C. an activation stage, subjecting the titanium dioxide to a flow of 50 Nl/hr of air for 120 minutes.

Thereupon there was carried out a corrosion stage with $AlCl_3$ and an oxidation stage at 500° C. by means of a 100 Nl/hr flow of a gaseous mixture of air and $AlCl_3$, wherein the partial pressure of $AlCl_3$ amounted to $3.7.10^{-2}$ atm. The treatment time amounted to 120 minutes.

At the end of the corrosion-oxidation stages there was obtained a coating of aluminum compounds equivalent to 1.48% by weight of $Al_2O_3$ on the total weight of the particles. The product thus obtained showed an atomic ratio Cl/Al of 0.20, a pH value of 4.6 and a specific surface of 6.1 sq.mt/g.

EXAMPLE 13

In this example a coated $TiO_2$ pigment was treated with monomethylether-ethylene glycol. To one part by weight of reactive $TiO_2$ coated with $SiO_2$ and $SiOCl_2$, and prepared according to the procedures of example No. 11, there were added 0.1 part of the above indicated glycol and 2.5 parts of n-hexane which serves as a solvent.

The reaction was conducted in a grinding jar at room temperature for 60 minutes. At the end of the reaction the phases were separated by filtering, and the solid product obtained was washed with n-hexane and then dried under vacuum at 60° C. for 18 hours.

In order to evaluate the affinity for organic substances of the end product, the oil absorption was determined according to the ASTM D 1483-60 method, the only difference being that instead of linseed oil dioctylphtalate was used as wetting agent. The oil absorption is expressed as the wetting point and corresponds to the number of cubic centimeters of dioctylphtalate required for obtaining a compact mix starting from 10 g of a $TiO_2$ sample.

The wetting point has been recorded on the attached table. For comparative purposes, there has been reported the wetting point for $TiO_2$ free of treatment, and for a $TiO_2$ subjected to a common wet post-treatment with a silica coating.

| Sample: | Wetting point: |
| --- | --- |
| $TiO_2$ of example | 2.85 |
| $TiO_2$ wet post-treated with $SiO_2$ | 2.82 |
| $TiO_2$ not post-treated | 3.90 |

From the examination of the table there can be seen that the wetting point of the sample, according to this invention, is practically identical with that obtained with the post-treatment of the prior art.

EXAMPLE 14

In the present example a reactive pigment of $TiO_2$, coated with $AlCl_3$ and AlOCl was prepared according to the procedures of Example 12, and was treated with monomethylether-ethylene glycol following the procedures indicated in Example 13.

On the dried end product there was evidenced the formation of a chemical bond between the glycol and the $TiO_2$ particles through thermal stability tests in explorative differential calorimetry.

In fact there was ascertained a heat absorption both at 130°–132° C. as well as at 200°–240° C. On the contrary, carrying out tests on non-reactive $TiO_2$ samples, treated with the glycol according to the procedures of example 13, there occurred a heat absorption only at 130°–132° C., which clearly corresponds to the desorption of the glycol which has a boiling temperature of 124° C. The heat absorption at 200° C. to 240° C. is thus connected with a rupture of chemical bonds of the glycol chemically fixed onto the surface of the $TiO_2$ particles.

The wetting point was determined by the procedures described in Example 13, on the product according to this invention and, just for comparative purposes, on a $TiO_2$ free of treatment as well as on a $TiO_2$ subjected to a common wet post-treatment with an alumina coating. The results thus obtained have been recorded on the table.

| Sample: | Wetting point: |
| --- | --- |
| $TiO_2$ of example | 2.90 |
| $TiO_2$ wet post-treated with alumina | 2.80 |
| $TiO_2$ not post-treated | 3.90 |

From the examination of the Table it will be seen that the $TiO_2$ post-treated according to the invention, has a wetting point near that obtained with a post-treatment of the prior art.

What is claimed is:

1. Titanium dioxide particles of morphological and granulometric pigmentary characteristics, said particles having a chemically reactive coating consisting essentially of a mixture of oxide and oxichloride selected from the group consisting of $Al_2O_3$ and $AlOCl$, $SiO_2$ and $SiOCl_2$, and $ZrO_2$ and $ZrOCl_2$.

2. Titanium dioxide particles according to claim 1, wherein the atomic ratio Cl/Al, Cl/Si or Cl/Zr of the coating is between 0.10 and 0.90.

3. A process for the preparation of $TiO_2$ particles with pigmentary morphological and granulometric characteristics having a chemically reactive coating, said process comprising the steps of: activating the surface of the particles in a moving bed by thermally treating said particles with an anhydrous gas at temperatures between about 400° and about 600° C.; and thereupon further reacting said particles in a moving bed with an inorganic chloride selected from the group consisting of $AlCl_3$, $SiCl_4$ and $ZrCl_4$, in the presence of a carrier gas and at temperatures between about 350° and about 600° C.

4. The process according to claim 3, wherein the thermal treatment of activation is carried out at temperatures between about 500° and about 600° C.

5. The process according to claim 3 or 4, wherein during the reaction stage of the particles with the inorganic chloride, a carrier gas selected from the group consisting of nitrogen and a noble gas is used.

6. The process according to claim 3 or 4, wherein contemporaneously with the reaction of the particles with the inorganic chloride, and at a temperature of at least about 400° C., the chloride is also made to react with oxygen to form the corresponding oxide for deposit on the surface of said particles.

7. The process according to claim 6, wherein air is used as a carrier gas during the reaction of the particles with the inorganic chloride and the reaction of the chloride itself with the oxygen.

8. The process according to claims 3,4,5,6 or 7 wherein the reaction of the particles with the inorganic chloride and the reaction of the chloride itself with oxygen are each carried out at temperatures between about 400° and about 500° C.

9. A process for preparing a titanium dioxide pigment coated with organic substances selected from the group consisting essentially of substances containing aminic, carboxylic or hydroxylic groups capable of imparting to the pigments an affinity for organic substances for organic vehicles; wherein the chemically reactive coated $TiO_2$ particles prepared according to the process of claim 3, are reacted with organic substances having —$NH_2$; —COOH or —OH groups.

10. The process according to claim 9, wherein the reaction is conducted at temperatures between about 20° and about 200° C.

11. The process according to claim 9 or claim 10, wherein the reaction is carried out in an aprotic organic solvent.

* * * * *

UNITED STATES PATENT AND TRADEMARK OFFICE
CERTIFICATE OF CORRECTION

PATENT NO. : 4,374,675

DATED : February 22, 1983

INVENTOR(S) : Carlo Scotti et al

It is certified that error appears in the above-identified patent and that said Letters Patent is hereby corrected as shown below:

On the title page, Item (75) Insert

-- Elio Santacesaria, Milan, Italy --.

Signed and Sealed this

Fifth Day of July 1983

[SEAL]

Attest:

GERALD J. MOSSINGHOFF

Attesting Officer

Commissioner of Patents and Trademarks